US011836839B2

(12) United States Patent
Zheng et al.

(10) Patent No.: US 11,836,839 B2
(45) Date of Patent: Dec. 5, 2023

(54) METHOD FOR GENERATING ANIMATION FIGURE, ELECTRONIC DEVICE AND STORAGE MEDIUM

(71) Applicant: BOE Technology Group Co., Ltd., Beijing (CN)

(72) Inventors: Rui Zheng, Beijing (CN); Fengshuo Hu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 82 days.

(21) Appl. No.: 17/620,596

(22) PCT Filed: Feb. 9, 2021

(86) PCT No.: PCT/CN2021/076257
§ 371 (c)(1),
(2) Date: Dec. 17, 2021

(87) PCT Pub. No.: WO2021/164653
PCT Pub. Date: Aug. 26, 2021

(65) Prior Publication Data
US 2022/0358705 A1    Nov. 10, 2022

(30) Foreign Application Priority Data
Feb. 18, 2020    (CN) .......................... 202010100100.7

(51) Int. Cl.
*G06T 13/40*    (2011.01)
*G06T 7/70*    (2017.01)
*G06V 10/44*    (2022.01)

(52) U.S. Cl.
CPC ................ *G06T 13/40* (2013.01); *G06T 7/70* (2017.01); *G06V 10/454* (2022.01)

(58) Field of Classification Search
None
See application file for complete search history.

(56) References Cited

U.S. PATENT DOCUMENTS 6,326,972 B1 * 12/2001 Buhler .................. G06T 11/001
345/474
8,929,600 B2 * 1/2015 Liu ........................ G06V 40/20
345/473
(Continued)

FOREIGN PATENT DOCUMENTS

CN    104658022 A    5/2015
CN    108009554 A    5/2018
(Continued)

OTHER PUBLICATIONS

Magnenat-Thalmann et al., "Data-driven approaches to digital human modeling" (Year: 2004).*
(Continued)

*Primary Examiner* — Hilina K Demeter
(74) *Attorney, Agent, or Firm* — IPro, PLLC

(57) ABSTRACT

The present disclosure provides a method for generating an animation figure, a device and a storage medium. The method includes: acquiring an image including at least one target object; acquiring position information about key points of the target object in the image; determining target angle information about lines connecting the key points in accordance with the position information about the key points; and adjusting a predetermined animation figure in accordance with the target angle information. A pose of a target animation figure acquired through adjustment is identical to a pose of the target object in the image, and the target animation figure corresponds to the target object.

14 Claims, 5 Drawing Sheets

(56) References Cited

U.S. PATENT DOCUMENTS

| | | | |
|---|---|---|---|
| 10,573,050 B1* | 2/2020 | Liu | G06T 17/20 |
| 10,621,779 B1* | 4/2020 | Topiwala | G06N 3/08 |
| 2008/0091373 A1* | 4/2008 | McGibbon | A61B 5/4528 |
| | | | 702/95 |
| 2010/0049675 A1* | 2/2010 | Ning | G06V 40/23 |
| | | | 706/46 |
| 2011/0157306 A1* | 6/2011 | Lin | G06T 19/006 |
| | | | 348/E13.001 |
| 2012/0327194 A1* | 12/2012 | Shiratori | G06F 3/011 |
| | | | 348/47 |
| 2017/0046865 A1 | 2/2017 | Cantwell | |
| 2019/0295305 A1* | 9/2019 | Yang | G06N 3/044 |
| 2019/0380792 A1* | 12/2019 | Poltaretskyi | G06N 3/084 |
| 2020/0272888 A1* | 8/2020 | Wang | G06V 40/103 |

FOREIGN PATENT DOCUMENTS

| | | |
|---|---|---|
| CN | 108629821 A | 10/2018 |
| CN | 109523615 A | 3/2019 |
| CN | 110399794 A | 11/2019 |

OTHER PUBLICATIONS

Miyasaka et al., "Reconstruction of realistic 3D surface model and 3D animation from range images obtained by real time 3D measurement system" (Year: 2000).*

Akagi et al., "Interactive 3D animation system based on touch interface and efficient creation tools" (Year: 2013).*

Fang, Hao-Shu, et al. "Rmpe: Regional multi-person pose estimation." Proceedings of the IEEE international conference on computer vision. 2017.

* cited by examiner

METHOD FOR GENERATING ANIMATION FIGURE, ELECTRONIC DEVICE AND STORAGE MEDIUM

CROSS-REFERENCE TO RELATED APPLICATION

The present application is the U.S. national phase of PCT Application No. PCT/CN2021/076257 filed on Feb. 9, 2021, which claims a priority of the Chinese patent application No. 202010100100.7 filed on Feb. 18, 2020, which are incorporated herein by reference in their entireties.

TECHNICAL FIELD

The present disclosure relates to the field of artificial intelligence technology, in particular to a method for generating an animation figure, an electronic device and a storage medium.

BACKGROUND

As a unique art form, animation art has its own features, and its artistic value and commercial value are increasingly conspicuous. Along with the development of economy, the animation art has infected and affected the whole world, in both a cultural field and an economic field, due to its great charm.

SUMMARY

In one aspect, the present disclosure provides in some embodiments a method for generating an animation figure, including: acquiring an image including at least one target object; acquiring position information about key points of the target object in the image; determining target angle information about lines connecting the key points in accordance with the position information about the key points; and adjusting a predetermined animation figure in accordance with the target angle information, a pose of a target animation figure acquired through adjustment being identical to a pose of the target object in the image.

In a possible embodiment of the present disclosure, the acquiring the position information about the key points of the target object in the image includes: predicting information about a candidate box for the target object in the image in accordance with the image; and inputting the information about the candidate box into a Single-Person Pose Estimator (SPPE) to acquire the position information about the key points.

In a possible embodiment of the present disclosure, the predicting the information about the candidate box for the target object in the image in accordance with the image includes: inputting the image into a convolutional neural network; acquiring a first feature map of the image generated by a last convolutional layer of the convolutional neural network; acquiring a second feature map of the image generated by a convolutional layer of the convolutional neural network before the last convolutional layer; and inputting the first feature map and the second feature map into a region proposal network to acquire the information about the candidate box outputted by the region proposal network.

In a possible embodiment of the present disclosure, the method further includes: subsequent to adjusting the predetermined animation figure in accordance with the target angle information, determining size information about the target object in the image in accordance with the position information about the key points; and adjusting a size of the predetermined animation figure in accordance with the size information, a size of the target animation figure acquired through adjustment being identical to a size of the target object in the image.

In a possible embodiment of the present disclosure, the method further includes, subsequent to adjusting the size of the predetermined animation figure in accordance with the size information, covering the target object in the image with the adjusted target animation figure to acquire the target animation figure corresponding to the target object.

In a possible embodiment of the present disclosure, the key points include a neck and two ankles of a human body, and the determining the size information about the target object in the image in accordance with the position information about the key points includes determining the size information about the target object in the image in accordance with position information about the neck and the two ankles of the target object.

In a possible embodiment of the present disclosure, the determining the size information about the target object in the image in accordance with the position information about the neck and the two ankles of the target object includes: determining a position of a first middle point between the two ankles of the target object in the image; and calculating a first distance between the position of the first middle point and a position of the neck as the size information ab out the target object.

In a possible embodiment of the present disclosure, the adjusting the predetermined animation figure in accordance with the target angle information includes: determining a position of a second middle point between two ankles of the predetermined animation figure; calculating a second distance between the position of the second middle point and a position of a neck of the predetermined animation figure; determining a scaling coefficient in accordance with the second distance and the first distance; and scaling the predetermined animation figure in accordance with the scaling coefficient, the size of the target animation figure acquired through scaling being identical to the size of the target object.

In a possible embodiment of the present disclosure, the adjusting the predetermined animation figure in accordance with the target angle information includes adjusting an angle of each line connecting the key points in the predetermined animation figure in accordance with the target angle information, and the adjusted angle of the line connecting the key points in the target animation figure is identical to a corresponding target angle in the target angle information.

In a possible embodiment of the present disclosure, the method further includes, subsequent to determining the target angle information about the lines connecting the key points in accordance with the position information about the key points, storing information about an angle of a line connecting one key point and the other key point relative to any coordinate axis in a pre-established coordinate system.

In a possible embodiment of the present disclosure, when the image includes a plurality of target objects, the acquiring the position information about the key points of the target object in the image includes: acquiring position information about key points of each target object in the image; and connecting the key points and dividing the key points into groups in accordance with the position information about the key points, to acquire the key points of each target object and the position information about the key points of each target object.

In a possible embodiment of the present disclosure, the method further includes: prior to acquiring the image including at least one target object, acquiring position information about key points of the predetermined animation figure; and determining angle information about lines connecting the key points of the predetermined animation figure in accordance with the position information about the key points of the predetermined animation figure.

In another aspect, the present disclosure provides in some embodiments an electronic device, including a memory, a processor, and a computer program stored in the memory and executed by the processor. The computer program is executed by the processor to implement the above-mentioned method for generating the animation figure.

In yet another aspect, the present disclosure provides in some embodiments a non-transitory computer-readable storage medium storing therein a computer instruction. The computer instruction is executed by a computer to implement the above-mentioned method for generating the animation figure.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in detail in conjunction with the drawings and embodiments.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In some screen-based interactive game scenarios, a cartoon figure is displayed on a screen to replace a target object. Usually, a figure of a to-be-replaced target object is annotated at first, then the figure of the target object and a stored cartoon figure are sampled to acquire replacement information, and then the figure of the target object is replaced with the cartoon figure in accordance with the replacement information, so as to acquire a target cartoon figure and display the cartoon figure corresponding to the target object on the screen. However, in this method, it is necessary to perform measurement and annotation in advance, so the entire procedure is relatively complex.

Figure 1:
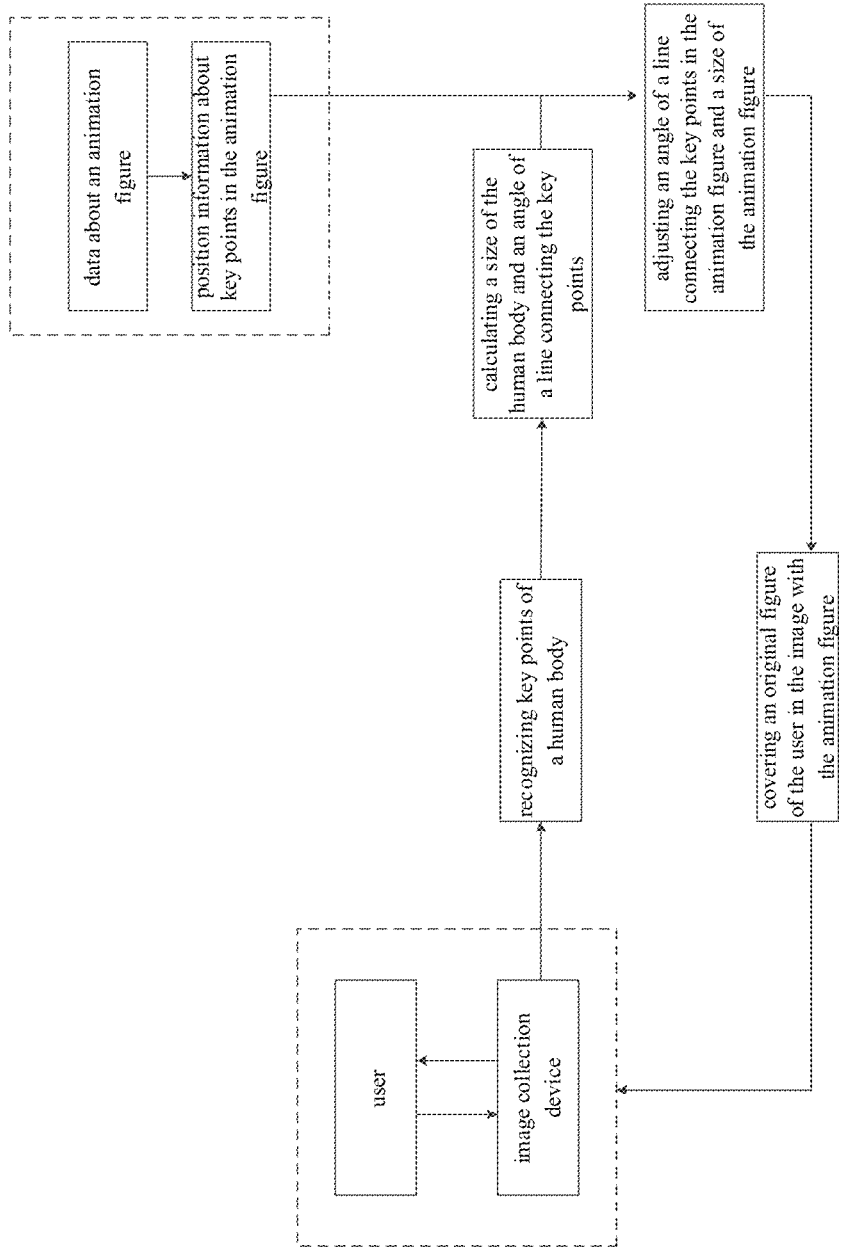
FIG. 1 is a schematic view showing a method for generating an animation figure according to one embodiment of the present disclosure.

The present disclosure provides in some embodiments a method for generating an animation figure, so as to replace a figure of at least one target object in an image with a predetermined animation figure. The implementation of the method will be described illustratively with reference to FIG. 1. Here, a human body is taken as a target object. As shown in FIG. 1, when a user goes through an image collection device, an image including at least one target object is collected. The at least one target object includes the user and any other target object. Key points of the human body are recognized in the collected image, so as to acquire position information about the key points of the human body. Human body size information is acquired through calculating a size of the human body in accordance with the position information about the key points of the human body, and angle information about lines connecting the key points is calculated in accordance with the position information about the key points. Then, a size of the predetermined animation figure and an angle of each line connecting the key points of the predetermined animation figure are adjusted in accordance with the size information and the angle information, and the figure of the human body in the image is covered with the predetermined animation figure acquired through adjustment (the predetermined animation figure includes data about the animation figure, and position information about the key points of the animation figure).

In some embodiments of the present disclosure, the method for generating the animation figure may be applied to a screen-based interactive game scenario. For example, an image collection device collects actions of the human body in real time, and after the action of the human body changes, generates the animation figure for the human body in real time. Then, the human body in an image collected by the image collection device is covered with the animation figure, and the image with the animation figure is displayed by a display device.

In some embodiments of the present disclosure, an animation figure covering may be performed on a recorded video by using the above-mentioned method, so as to cover a figure of a human body in the video with an animation figure and display the video with the animation figure.

Figure 2:
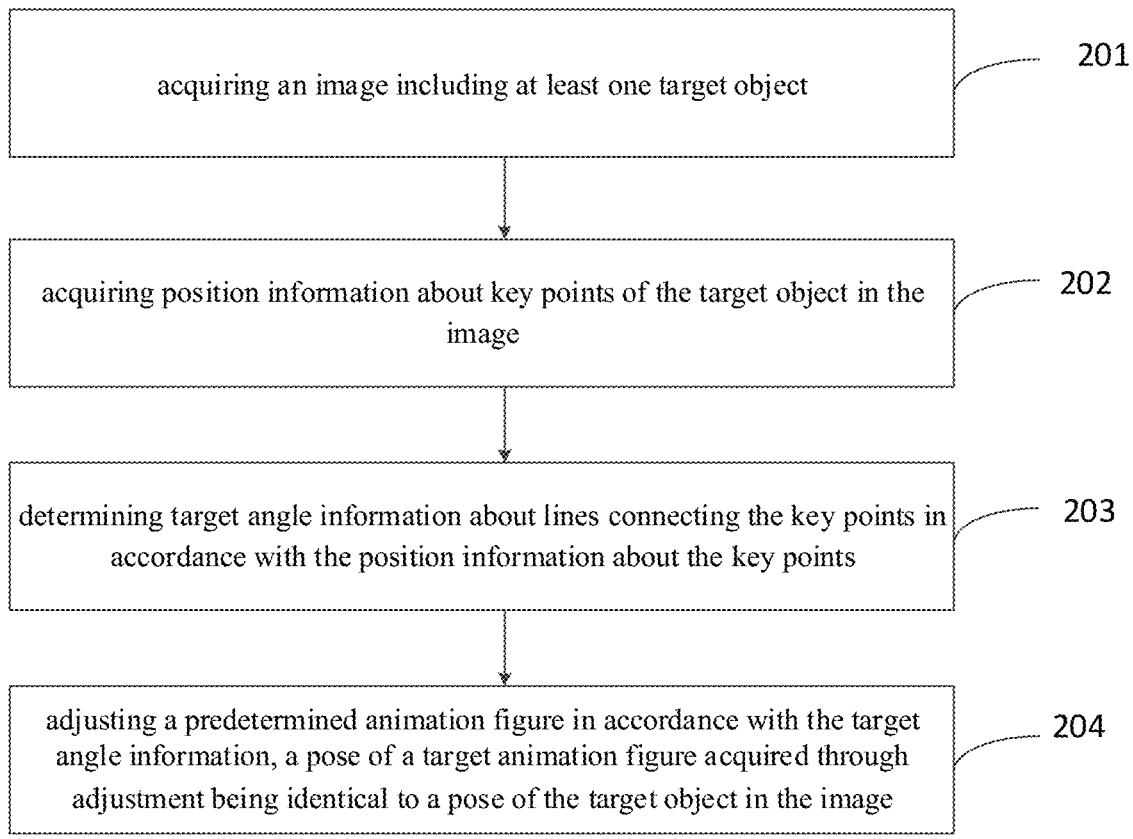
FIG. 2 is a flow chart of the method for generating the animation figure according to one embodiment of the present disclosure.

The present disclosure provides in some embodiments a method for generating an animation figure which, as shown in FIG. 2, includes the following steps.

Step 201: acquiring an image including at least one target object.

For example, the image including the at least one target object is acquired through an image collection device, e.g., a camera.

Step 202: acquiring position information about key points of the target object in the image.

The position information is coordinates of each key point in a coordinate system.

For example, the key points of all the target objects in the image are recognized through a Single-Person Pose Estimator (SPPE), so as to acquire the position information about the key points of all the target objects. For example, the position information about each key point is coordinates of the key point. The coordinates of the key points include coordinates of points at, e.g., a top of head, facial features, neck and principal joints in limbs. In some embodiments of the present disclosure, each target object is recognized through a target object detector, and then the recognized target object is inputted into the SPPE, so that the SPPE recognizes the key points of each target object.

In some embodiments of the present disclosure, all the key points (i.e., the key points of all the target objects) in the image are detected through such an algorithm as OpenPose or DeepCut, and then the key points are connected to form lines and divided into groups, so as to find out the key points of each target object.

Step 203: determining target angle information about the lines connecting the key points in accordance with the position information about the key points.

On the basis that the position information about the key points are coordinates of the key points, the target angle information about the lines connecting the key points is an angle between a line connecting two key points and any coordinate axis in a coordinate system corresponding to the image.

Step 204: adjusting a predetermined animation figure in accordance with the target angle information, a pose of a target animation figure acquired through adjustment being identical to a pose of the target object in the image.

In a possible embodiment of the present disclosure, key points in the predetermined animation figure have already been recognized. Upon the acquisition of the target angle information, angles of lines connecting the key points in the predetermined animation figure are adjusted in accordance with the target angle information, so that the pose of the adjusted animation figure is identical to the pose of the target object in the image.

For example, the animation figure is displayed by a display screen of an electronic device. In addition, when the target animation figure is used to replace the target object in the image, the target animation figure is presented in the image.

According to the method for generating the animation figure in the embodiments of the present disclosure, the position information about the key points of at least one target object in the image is acquired to determine the target angle information about the lines connecting the key points of the target object, and then the angles of the lines connecting the key points in the predetermined animation figure are adjusted in accordance with the target angle information, so as to enable the pose of the predetermined animation figure to be identical to the pose of the target object. As a result, it is able to replace the figure of the target object in the image with the target animation figure acquired through adjustment, thereby to present the target animation figure corresponding to the target object in accordance with the pose of the target object in a more vivid manner.

In a possible embodiment of the present disclosure, the method further includes: subsequent to adjusting the predetermined animation figure in accordance with the target angle information, determining size information about the target object in the image in accordance with the position information about the key points; and adjusting a size of the predetermined animation figure in accordance with the size information, a size of the target animation figure acquired through adjustment being identical to a size of the target object in the image.

For example, the position information about each key point is coordinates of the key point in the image, and the size information about the target object in the image is determined in accordance with the coordinates of the key points.

After the size of the predetermined animation figure has been adjusted to be identical to the size of the target object, the figure of the target object in the image is replaced with the target animation figure acquired through adjustment, and then the target animation figure with a same size and a same pose as the target object is displayed in the image.

In a possible embodiment of the present disclosure, the method further includes, subsequent to adjusting the size of the predetermined animation figure in accordance with the size information, covering the target object in the image with the adjusted target animation figure to acquire the target animation figure corresponding to the target object.

For example, upon the acquisition of the adjusted target animation figure, the figure of the target object in the image is covered by the adjusted target animation figure, with the key points of the target animation image corresponding to the key points of the target object in the image respectively. After the covering, it is able to replace the target object in the image with the target animation figure.

Figure 3:
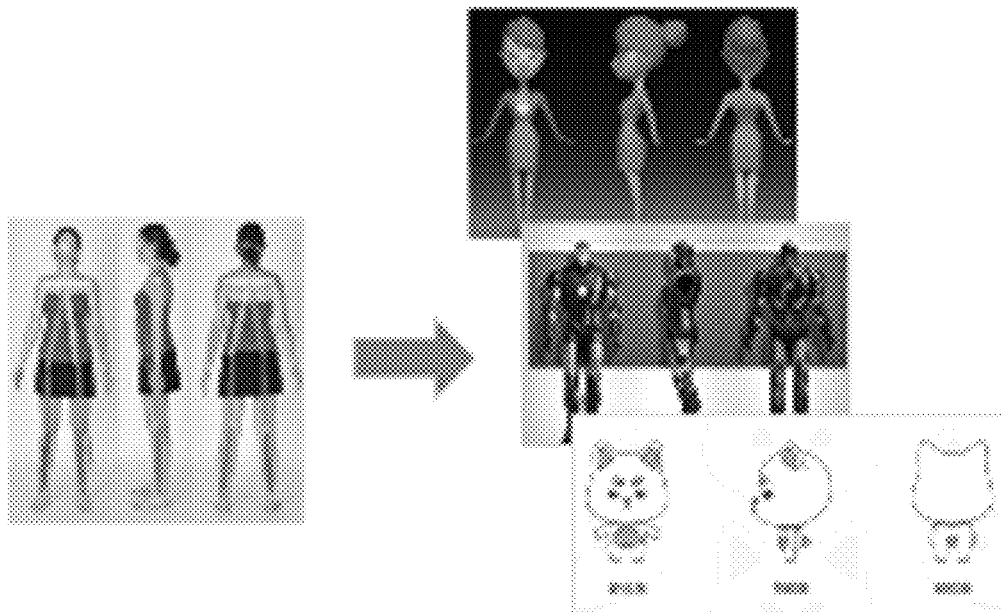
FIG. 3 is a schematic view showing various predetermined animation figures generated by using the method for generating the animation figure according to one embodiment of the present disclosure.

As shown in FIG. 3, the predetermined animation figure is adjusted in accordance with the target angle information about the lines connecting the key points of the target object (human body) in different poses and size information about the target object, and then the human body is covered by the adjusted target animation figure. As shown in FIG. 3, various predetermined animation figures are adopted, and adjusted to acquire various target animation figures with a same size and a same pose as the human body.

In a possible embodiment of the present disclosure, the target object includes a human body, and the key points include a neck and two ankles of the human body. The determining the size information about the target object in the image in accordance with the position information about the key points includes determining the size information about the target object in the image in accordance with position information about the neck and the two ankles of the target object.

Figure 4:
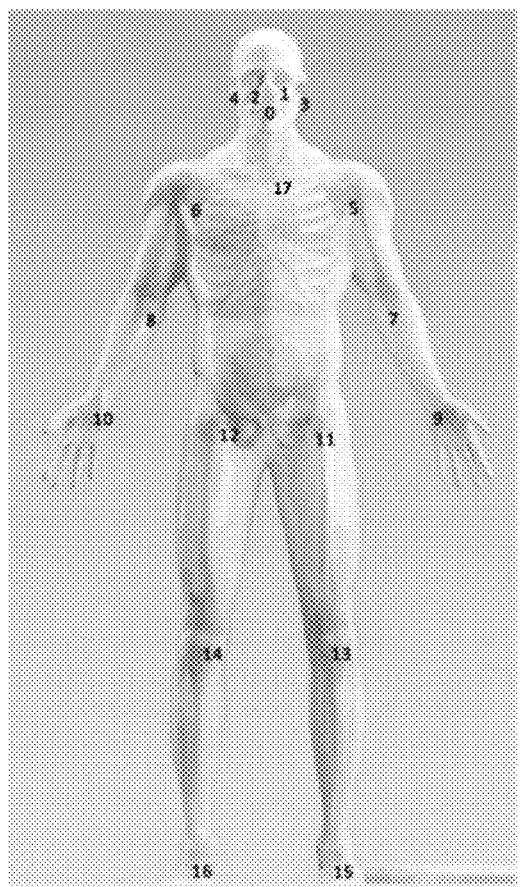
FIG. 4 is a schematic view showing key points of a human body according to one embodiment of the present disclosure.

For example, the position information about the key points of the human body is annotated and stored. As shown in FIG. 4, serial numbers 0 to 17 correspond to the key points of the human body respectively. Based on the stored position information about the key points of the human body, the size information about the human body is calculated in accordance with a distance between the neck and the ankles of the human body through the following equation: $L=\sqrt{(x1-x2)^2+(y1-y2)^2}$, where $(x_1, y_1)$ represents average values of coordinates of the two ankles (i.e., values of coordinates of a middle point of the two ankles, e.g., a distance between the two key points 15 and 16 in FIG. 4), and $(x_2,$ $y_2$) represents coordinates of the neck of the human body, i.e., coordinates of the key point 17 in FIG. 4. When the size of the human body in the image is L through the above equation, the size of the predetermined animation figure is L' and a scaling coefficient of the predetermined animation figure to be scaled is k, i.e., k=L'/L. The size of the predetermined animation figure is scaled in accordance with k to acquire the size of target animation figure.

In a possible embodiment of the present disclosure, the determining the size information about the target object in the image in accordance with the position information about the neck and the two ankles of the target object includes: determining a position of a first middle point between the two ankles of the target object in the image; and calculating a first distance between the position of the first middle point and a position of the neck as the size information ab out the target object.

For example, two position coordinates of the two angles of the target object in the image are determined at first, and then coordinates of the first middle point between the two position coordinates are calculated. The acquired coordinates are used to represent the position of the first middle point between the two angles of the target object.

For example, the position of the neck is represented by using coordinates of the neck of the target object in the image. Hence, the distance between the middle point and the neck is calculated in accordance with the coordinates of the middle point and the coordinates of the neck, so as to acquire the size information about the target object.

In a possible embodiment of the present disclosure, the adjusting the predetermined animation figure in accordance with the target angle information includes: determining a position of a second middle point between two ankles of the predetermined animation figure; calculating a second distance between the position of the second middle point and a position of a neck of the predetermined animation figure; determining a scaling coefficient in accordance with the second distance and the first distance; and scaling the predetermined animation figure in accordance with the scaling coefficient, the size of the target animation figure acquired through scaling being identical to the size of the target object.

In a possible embodiment of the present disclosure, the acquiring the position information about the key points of the target object in the image includes: predicting information about a candidate box for the target object in the image in accordance with the image; and inputting the information about the candidate box into an SPPE to acquire the position information about the key points.

For example, the image is inputted to Faster R-CNN, and the candidate box for the target object in the image is predicted through Faster R-CNN.

Figure 5:
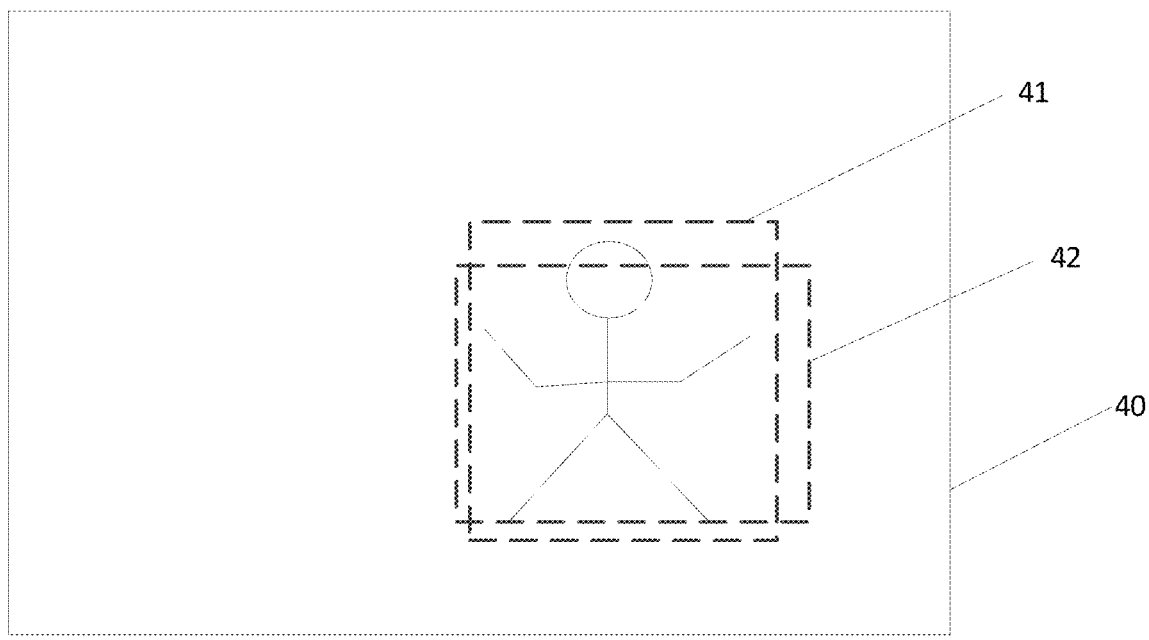
FIG. 5 is a schematic view showing candidate boxes in an image according to one embodiment of the present disclosure.

As shown in FIG. 5, in an image 40, a rectangular box 41 indicates an actual position of the target object in the image, and a rectangular box 42 indicates a position of the target object in the image predicted using a Faster R-CNN detection algorithm. The rectangular box 42 is inputted into an SPPE network, so as to acquire the position information about the key points of the target object. The SPPE network is a top-down recognition structure, i.e., the human bodies are detected in the image and then the key points of each human body is recognized. Hence, when returning the recognized key points, the position information of the target object in the image and the angle information about the lines connecting the key points are returned too. In this way, it is able to reset the predetermined animation figure with the recognized key points in accordance with the target angle information, scale the predetermined animation figure in accordance with the size of the target object, and then place the scaled animation figure at a corresponding position in the image, so as to replace the figure of the target object. When the key points of the target object are recognized through the SPPE, it is able to replace the target object with the animation figure rapidly even in a scenario where the image includes a plurality of target objects.

In a possible embodiment of the present disclosure, the predicting the information about the candidate box for the target object in the image in accordance with the image includes: inputting the image into a convolutional neural network; acquiring a first feature map of the image generated by a last convolutional layer of the convolutional neural network; acquiring a second feature map of the image generated by a convolutional layer of the convolutional neural network before the last convolutional layer; and inputting the first feature map and the second feature map into a Region Proposal Network (RPN) to acquire the information about the candidate box outputted by the region proposal network.

For example, the convolutional neural network is an R-CNN_base network in the R-CNN. The R-CNN includes the R-CNN_base network and an R-CNN top network. The R-CNN_base network is a part of the R-CNN for extracting an image feature, and includes a basic network for extracting the feature, e.g., VGG16 or Residual Network (ResNet). The R-CNN top is a part of the R-CNN for processing the feature, e.g., a part for acquiring a confidence level and a target box through such impure CNN operations as classification using softmax. This part has a function of combining the features before shaping. An input dimension of the feature map is identical to an output dimension of a Region of Interest (ROI) pooling layer, and an output dimension of the feature map is identical to an input dimension desired for the classification and the positioning of the target box.

For example, the convolutional layer of the R-CNN_base network before the last convolutional layer is any one or more convolutional layers of the R-CNN_base network before the last convolutional layer, or all the convolutional layers before the last convolutional layer.

Figure 6:
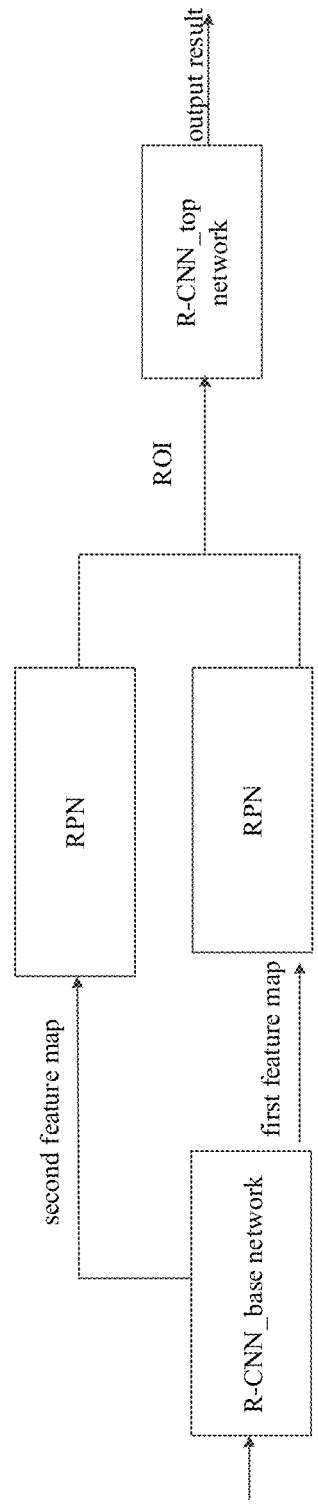
FIG. 6 is a schematic view showing the detection of the candidate box of a target object in the image through R-CNN according to one embodiment of the present disclosure.

As shown in FIG. 6, after the image has been inputted into the R-CNN_base network, the first feature map and the second feature map are acquired. Then, the first feature map and the second feature map are inputted into the RPN, and the RPN selects regions of the image where the target object occurs most likely, i.e., Region of interests (Rois) or the information about the candidate boxes. The Rois serves as an input of the R-CNN top network. The R-CNN top network determines accurate coordinates and a category of the target object in the ROI in accordance with the information about the candidate boxes.

When the candidate box is detected by the R-CNN_base network, not only the first feature map but also the second feature map are inputted into the RPN, so the target object in the image is provided with more samples having different sizes as the target candidate boxes. Through comparing the confidence levels of the target object at similar positions, it is able to acquire a detection result of the candidate box having a higher confidence level and positioned more accurately.

In a possible embodiment of the present disclosure, the method further includes, subsequent to determining the target angle information about the lines connecting the key points in accordance with the position information about the key points, storing information about an angle of a line connecting one key point and the other key point relative to any coordinate axis in a pre-established coordinate system.

The pre-established coordinate system is a rectangular plane coordinate system with a length direction of the image as an X-axis and a width direction of the image as a Y-axis, or with the length direction of the image as the Y-axis and the width direction of the image as the X-axis. The stored angle information is information about an angle between the line and the X-axis or the Y-axis.

In some embodiments of the present disclosure, the information about the angle between the line and the coordinate axis is stored, so as to analyze the target object subsequently in accordance with the stored angle information.

In some embodiments of the present disclosure, after analyzing the target object, the stored angle information is deleted, so as to save a storage space.

In a possible embodiment of the present disclosure, each key point is a position where a joint of the human body is located. The joints of the human body include, but not limited to, joints 5 to 17 other than the facial features in FIG. 4. It should be appreciated that, in another possible embodiment of the present disclosure, the key points further include the facial features of the human body, e.g., the facial features 0 to 4 in FIG. 4.

In a possible embodiment of the present disclosure, the image includes at least one frame in a consecutive video image. When the animation figure is presented, the animation image is presented in the video image.

Based on the above, each image in a video is subjected to the operations in Steps 201 to 204, so as to replace the figures of all the target objects in the video with the corresponding animation figures. In addition, an animation figure with a same pose as the target object is presented in the video in accordance with the pose of the target object, so as to present an animation figure for the figure of the target object in the video, thereby to improve the visual experience for a user.

In a possible embodiment of the present disclosure, the method further includes: prior to acquiring the image including at least one target object, acquiring position information about key points of the predetermined animation figure; and determining angle information about lines connecting the key points of the predetermined animation figure in accordance with the position information about the key points of the predetermined animation figure.

The position information about the key points of the predetermined animation figure is acquired in a same way as the position information about the key points of the target object, which will thus not be particularly defined herein.

In a possible embodiment of the present disclosure, the adjusting the predetermined animation figure in accordance with the target angle information includes adjusting an angle of each line connecting the key points in the predetermined animation figure in accordance with the target angle information, and the adjusted angle of the line connecting the key points in the target animation figure is identical to a corresponding target angle in the target angle information.

The angle of the line connecting the key points in the predetermined animation figure is adjusted in such a manner as to be identical to the corresponding target angle in the target angle information. For example, when an angle of a line connecting two key points corresponding to a wrist joint and an elbow joint of the target object is 90°, an angle of a line connecting two key points corresponding to a wrist joint and an elbow joint of the predetermined animation figure is adjusted to 90°, so that the pose of the predetermined animation figure is identical to the pose of the target object.

In a possible embodiment of the present disclosure, the method further includes, subsequent to acquiring the position information about the key points of the predetermined animation figure, determining size information about the predetermined animation figure in accordance with the position information about the key points of the predetermined animation figure.

Based on the above, before adjusting the predetermined animation figure in accordance with the size of the target image, the size information about the predetermined animation figure is pre-stored. In this way, it is able to adjust the size of the predetermined animation figure rapidly.

It should be appreciated that, the method in the embodiments of the present disclosure is executed by a single device, e.g., a computer or server. The method in the embodiments of the present disclosure is also applicable in a distributed scenario, and executed by a plurality of devices. In the distributed scenario, one of the plurality of devices is configured to merely execute one or more steps of the method, and the plurality of devices interacts to complete the method.

The specific embodiments have been described hereinabove, and the other embodiments also shall fall within the scope defined by the appended claims. In some cases, the actions or steps in the appended claims are executed in an order different from that mentioned in the embodiments of the present disclosure, with an expected result too. In addition, the process in the drawings is not necessarily to be performed in a given order or performed continuously to achieve the expected result. In some embodiments of the present disclosure, multitasking or parallel processing is also adopted or possibly advantageous.

Figure 7:
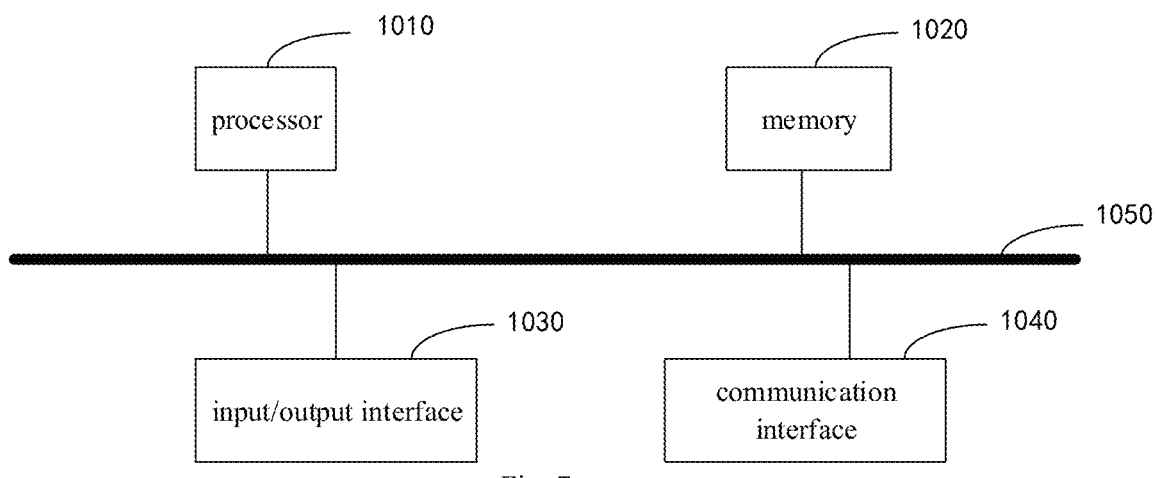
FIG. 7 is a block diagram of an electronic device according to one embodiment of the present disclosure.

The present disclosure further provides in some embodiments an electronic device which, as shown in FIG. 7, includes a processor 1010, a memory 1020, an input/output interface 1030, a communication interface 1040 and a bus 1050. The processor 1010, the memory 1020, the input/output interface 1030 and the communication interface 1040 are in communication with each other via the bus 1050.

The processor 1010 is implemented in the form of a general-purpose Central Processing Unit (CPU), a microprocessor, an Application Specific Integrated Circuit (ASIC), or one or more integrated circuits. The processor 1010 is configured to execute a relevant program so as to implement the above-mentioned method.

The memory 1020 is implemented in the form of a Read Only Memory (ROM), a Random Access Memory (RAM), a static memory or a dynamic memory. The memory 1020 is configured to store therein an operating system and an application. When the method in the embodiments is implemented through software or firmware, relevant program codes are stored in the memory 1020 and called by the processor 1010.

The input/output interface 1030 is coupled to an input/output module, so as to input/output information. The input/output module serves as an assembly of the device (not shown) or an external module of the device, so as to provide a corresponding function. An input device includes a keyboard, a mouse, a touch panel, a microphone or sensors. An output device includes a display, a loudspeaker, a vibrator or an indicator.

The communication interface 1040 is coupled to a communication module (not shown), so as to enable the device to communicate with the other device in a wired manner (e.g., via a Universal Serial Bus (USB) or a network cable) or in a wireless manner (e.g., via a mobile network, Wireless Fidelity (WiFi) or Bluetooth).

The bus 1050 includes a path for transmitting information among the assemblies of the device (e.g., the processor 1010, the memory 1020, the input/output interface 1030 and the communication interface 1040).

It should be appreciated that, although the processor 1010, the memory 1020, the input/output interface 1030, the communication interface 1040 and the bus 1050 are shown hereinabove, the device may further include any other assemblies desired for the normal operation. In addition, it should be further appreciated that, the device may also merely include the necessary assemblies rather than all the assemblies in FIG. 7.

The computer-readable storage medium may include volatile or nonvolatile, mobile or immobile storage medium capable of storing therein information using any method or technique. The information may be a computer-readable instruction, a data structure, a program or any other data. The computer-readable storage medium may include, but not limited to, a Random Access Memory (e.g., Phase Change Random Access Memory (PRAM), Static Random Access Memory (SRAM) or Dynamic Random Access Memory (DRAM)), a Read Only Memory (ROM) (e.g., an Electrically Erasable Programmable Read Only Memory (EEPROM), a flash memory, a Compact Disc Read Only Memory (CD-ROM) or a Digital Video Disk (DVD)), a magnetic storage device (e.g., a cassette magnetic tape or a magnetic disk), or any other non-transmission medium capable of storing therein information which can be accessed by a computing device.

The above embodiments are for illustrative purposes only, but shall not be construed as limiting the scope of the present disclosure (including the appended claims). Based on the concept of the present disclosure, the embodiments or the technical features in the embodiments may be combined, and for clarification, any other changes will not be provided in details.

In addition, for clarification and for ease of understanding, any known power source/ground end coupled to the Integrated Circuit (IC) and the other members is shown or not shown in the drawings. In addition, the device is shown in the form of a block diagram, so as to facilitate the understanding of the present disclosure, and take the fact that the details about the implementation of the device shown in the block diagram depend on a platform for implementing the present disclosure into consideration (i.e., these details shall completely fall within the capability of a person skilled in the art). In the case that the specific details (e.g., the circuit) has been given to describe the embodiments of the present disclosure, it is obvious to a person skilled in the art that the present disclosure is also capable of being implemented without these specific details or with any change in these specific details, so the description shall be of a merely illustrative but in no way restrictive nature.

Although the above description has been given in conjunction with the embodiments, it will be apparent to a person skilled in the art to make any substitution, alteration and modification based on the above description. For example, any other memory architecture (e.g., Dynamic RAM (DRAM)) is also applied to the discussed embodiments.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for generating an animation figure, comprising:
   acquiring an image comprising at least one target object;
   acquiring position information about key points of the target object in the image;
   determining target angle information about lines connecting the key points in accordance with the position information about the key points; and
   adjusting a predetermined animation figure in accordance with the target angle information, a pose of a target animation figure acquired through adjustment being identical to a pose of the target object in the image;
   wherein the method further comprises:
   subsequent to adjusting the predetermined animation figure in accordance with the target angle information, determining size information about the target object in the image in accordance with the position information about the key points; and
   adjusting a size of the predetermined animation figure in accordance with the size information, a size of the target animation figure acquired through adjustment being identical to a size of the target object in the image;
   wherein the key points comprise a neck and two ankles of a human body, and the determining the size information about the target object in the image in accordance with the position information about the key points comprises determining the size information about the target object in the image in accordance with position information about the neck and the two ankles of the target object; and
   wherein the determining the size information about the target object in the image in accordance with the position information about the neck and the two ankles of the target object comprises:
   determining a position of a first middle point between the two ankles of the target object in the image; and
   calculating a first distance between the position of the first middle point and a position of the neck as the size information about the target object.

2. The method according to claim 1, wherein the acquiring the position information about the key points of the target object in the image comprises:
   predicting information about a candidate box for the target object in the image in accordance with the image; and
   inputting the information about the candidate box into a Single-Person Pose Estimator (SPPE) to acquire the position information about the key points.

3. The method according to claim 2, wherein the predicting the information about the candidate box for the target object in the image in accordance with the image comprises:
   inputting the image into a convolutional neural network;
   acquiring a first feature map of the image generated by a last convolutional layer of the convolutional neural network;
   acquiring a second feature map of the image generated by a convolutional layer of the convolutional neural network before the last convolutional layer; and
   inputting the first feature map and the second feature map into a region proposal network to acquire the information about the candidate box outputted by the region proposal network.

4. The method according to claim 1, further comprising, subsequent to adjusting the size of the predetermined animation figure in accordance with the size information, covering the target object in the image with the adjusted target animation figure to acquire the target animation figure corresponding to the target object.

5. The method according to claim 1, wherein the adjusting the predetermined animation figure in accordance with the target angle information comprises:
   determining a position of a second middle point between two ankles of the predetermined animation figure;
   calculating a second distance between the position of the second middle point and a position of a neck of the predetermined animation figure;
   determining a scaling coefficient in accordance with the second distance and the first distance; and
   scaling the predetermined animation figure in accordance with the scaling coefficient, the size of the target animation figure acquired through scaling being identical to the size of the target object.

6. The method according to claim 1, wherein the adjusting the predetermined animation figure in accordance with the target angle information comprises adjusting an angle of each line connecting the key points in the predetermined animation figure in accordance with the target angle information, and the adjusted angle of the line connecting the key points in the target animation figure is identical to a corresponding target angle in the target angle information.

7. The method according to claim 1, further comprising, subsequent to determining the target angle information about the lines connecting the key points in accordance with the position information about the key points, storing information about an angle of a line connecting one key point and the other key point relative to any coordinate axis in a pre-established coordinate system.

8. The method according to claim 1, wherein when the image comprises a plurality of target objects, the acquiring the position information about the key points of the target object in the image comprises:
   acquiring position information about key points of each target object in the image; and
   connecting the key points and dividing the key points into groups in accordance with the position information about the key points, to acquire the key points of each target object and the position information about the key points of each target object.

9. The method according to claim 1, further comprising:
   prior to acquiring the image comprising at least one target object, acquiring position information about key points of the predetermined animation figure; and
   determining angle information about lines connecting the key points of the predetermined animation figure in accordance with the position information about the key points of the predetermined animation figure.

10. An electronic device, comprising a memory, a processor, and a computer program stored in the memory and executed by the processor, wherein the computer program is executed by the processor to implement:
    acquiring an image comprising at least one target object;
    acquiring position information about key points of the target object in the image;
    determining target angle information about lines connecting the key points in accordance with the position information about the key points; and
    adjusting a predetermined animation figure in accordance with the target angle information, a pose of a target animation figure acquired through adjustment being identical to a pose of the target object in the image;
    the computer program is further executed by the processor to implement:
    subsequent to adjusting the predetermined animation figure in accordance with the target angle information, determining size information about the target object in the image in accordance with the position information about the key points; and
    adjusting a size of the predetermined animation figure in accordance with the size information, a size of the target animation figure acquired through adjustment being identical to a size of the target object in the image; and
    the key points comprise a neck and two ankles of a human body, and the computer program is further executed by the processor to implement: determining the size information about the target object in the image in accordance with position information about the neck and the two ankles of the target object; and
    wherein the computer program is further executed by the processor to implement:
    determining a position of a first middle point between the two ankles of the target object in the image; and
    calculating a first distance between the position of the first middle point and a position of the neck as the size information about the target object.

11. The electronic device according to claim 10, wherein the computer program is further executed by the processor to implement:
    predicting information about a candidate box for the target object in the image in accordance with the image; and
    inputting the information about the candidate box into a Single-Person Pose Estimator (SPPE) to acquire the position information about the key points.

12. The electronic device according to claim 11, wherein the computer program is further executed by the processor to implement:
    inputting the image into a convolutional neural network;
    acquiring a first feature map of the image generated by a last convolutional layer of the convolutional neural network;
    acquiring a second feature map of the image generated by a convolutional layer of the convolutional neural network before the last convolutional layer; and
    inputting the first feature map and the second feature map into a region proposal network to acquire the information about the candidate box outputted by the region proposal network.

13. The electronic device according to claim 10, wherein the computer program is further executed by the processor to implement:
    determining a position of a second middle point between two ankles of the predetermined animation figure;
    calculating a second distance between the position of the second middle point and a position of a neck of the predetermined animation figure;
    determining a scaling coefficient in accordance with the second distance and the first distance; and
    scaling the predetermined animation figure in accordance with the scaling coefficient, the size of the target animation figure acquired through scaling being identical to the size of the target object.

14. A non-transitory computer-readable storage medium storing therein a computer instruction, wherein the computer instruction is executed by a computer to implement:
    acquiring an image comprising at least one target object;
    acquiring position information about key points of the target object in the image;

determining target angle information about lines connecting the key points in accordance with the position information about the key points; and adjusting a predetermined animation figure in accordance with the target angle information, a pose of a target animation figure acquired through adjustment being identical to a pose of the target object in the image;

the computer instruction is further executed by the computer to implement:

subsequent to adjusting the predetermined animation figure in accordance with the target angle information, determining size information about the target object in the image in accordance with the position information about the key points; and adjusting a size of the predetermined animation figure in accordance with the size information, a size of the target animation figure acquired through adjustment being identical to a size of the target object in the image; and the key points comprise a neck and two ankles of a human body, and the computer instruction is further executed by the computer to implement: determining the size information about the target object in the image in accordance with position information about the neck and the two ankles of the target object; and wherein the computer instruction is further executed by the computer to implement:

determining a position of a first middle point between the two ankles of the target object in the image; and calculating a first distance between the position of the first middle point and a position of the neck as the size information about the target object.

* * * * *